Figure 1:
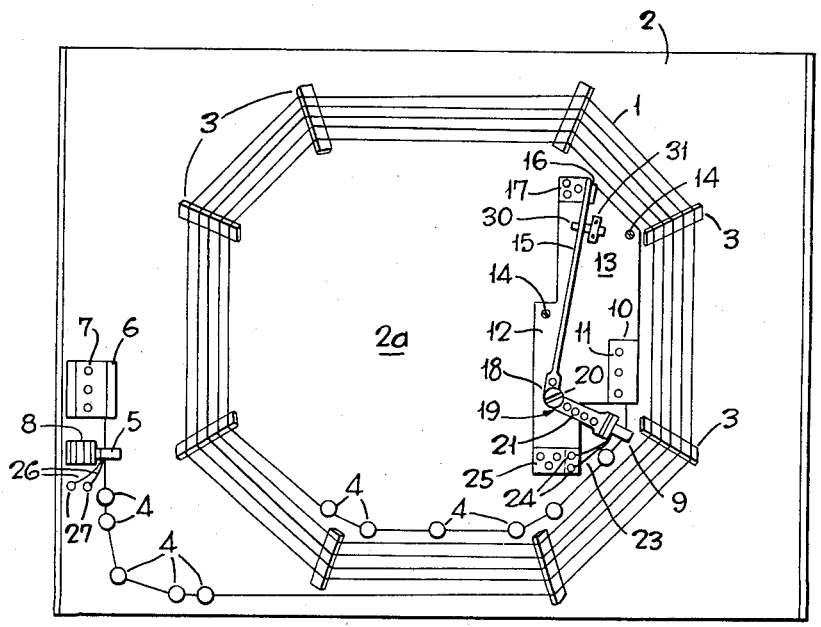

May 2, 1961 C. W. M. BARROW ET AL 2,982,925
MAGNETO-STRICTIVE DELAY LINES
Filed March 27, 1959

INVENTORS
CHRISTOPHER WILFRED MEREFIELD BARROW
RAYMOND JOHN FREDERICK DERBYSHIRE

BY Larson and Taylor
ATTORNEYS

United States Patent Office 2,982,925
Patented May 2, 1961

2,982,925

MAGNETO-STRICTIVE DELAY LINES

Christopher Wilfred Merefield Barrow, Dunton Green, near Sevenoaks, and Raymond John Frederick Derbyshire, Welling, England, assignors to Siemens Edison Swan Limited, London, England, a British company Filed Mar. 27, 1959, Ser. No. 802,509

Claims priority, application Great Britain Apr. 1, 1958

4 Claims. (Cl. 333—30)

This invention relates to so-called magneto-strictive or acoustic delay lines, which consist basically of a delay element constituted by a length of tape or wire of a ferromagnetic material and coupled electro-magnetically with an input coil adjacent one end and an output coil adjacent the other end, this latter coil being associated with a small permanent magnet which is positioned so as to set up a steady magnetic field through the coil. A varying current in the input coil causes changes in the magnetisation of the delay element which produce changes in its dimensions due to the well-known magnetostrictive effect. These changes in the dimensions result in longitudinal stress waves being propagated along the delay element, in both directions from the input coil, with a velocity V which is approximately equal to the speed of sound through the material of the delay element and is given by the formula $$V = \sqrt{\frac{E}{d}}$$

where E is Young's modulus of elasticity and d is the density of the material. The longitudinal stress waves travelling along the delay element produce dimensional changes therein during their progress. In the portion of the element passing through the output coil these dimentional changes vary the reluctance of the magnetic circuit provided by the permanent magnet and the resulting change of the flux causes small voltages to be induced into the windings of the output coil. The delay introduced by the delay element depends on the distance between the input and output coils and the speed of sound in the material used. There is no need for the acoustic path to be straight and the delay element may be coiled up so as to occupy only a small space.

It is necessary to terminate the delay element at each end with some form of damping medium in order to prevent reflection of the longitudinal waves from the ends of the element, some of the most suitable materials for this purpose being thick grease, rubber or P.V.C.

Such a delay line finds application in the electronic art, in computers, in automatic telephone exchanges and so on, and its delay element may be of considerable length to give delays of the order of one or more milliseconds. The delay line may be used as a temporary information store, in which event its storage time is that of its delay, or as a circulating store in which signals from the output coil of the line are continuously fed back to the input coil for re-storage, so that the overall storage time for a given item of information may be any desired period.

Since the delay time of a magnetostrictive delay line is a function of the elastic constants and length of the delay element, it is therefore temperature dependent. Consequently in using such lines for signal storage they cannot readily be synchronised with other timed cycles since variation of temperature can cause such large changes of delay time that it is difficult to identify the stored signals on a time basis.

This drawback can be overcome either by placing the delay element in a temperature controlled oven—which is not usually practicable unless the oven can be shared by the delay elements of a large number of delay lines, even at the inconvenience of having the delay lines at some distance from their associated apparatus—or by using for the delay element some ferro-magnetic material, such as certain nickel-iron alloys, having a negligible temperature coefficient. Proposals have also been previously made to pass through the delay element a heating current which is automatically controlled, in accordance with a temperature-dependent characteristic of the element such as its electrical resistance or its delay time, in such manner as to maintain the temperature substantially constant. These proposals, however, require the provisions of additional circuits.

According to the present invention variation of the delay time of a magnetostrictive delay line with variation in ambient temperature is minimised by mounting one of the delay line coils, namely the input coil or the output coil, for compensatory displacement along the delay element of the line in accordance with the movement of a bi-metallic strip responsive to the ambient temperature, the displaceable coil being coupled to the bi-metallic strip through a movement magnifying mechanism which imparts the compensatory displacement to the coil.

In the case of a long delay element, for instance one of some fifteen feet in length giving a delay time for the delay line of 900 microseconds, the expected ambient temperature variation may be such as to cause an overall variation of 2.5 microseconds in the delay time of the line and to compensate for this variation a coil displacement of a quarter of an inch or more on each side of a mean position may be required, that is half an inch overall. For the sake of compactness the delay element could be coiled around a central area and in order to keep the overall delay line arrangement compact it would be preferable to accommodate the components providing temperature compensation in accordance with the invention within this central area. If, however, the bi-metallic strip was arranged to produce the compensatory coil displacement directly, the length of bimetallic strip required, for instance some twenty inches for an overall displacement of half an inch, might be too great to allow this. This difficulty is avoided, in the arrangement of the invention, by the provision of the movement magnifying mechanism between the displaceable coil and the bi-metallic strip. For instance, if this mechanism gives a magnification of, say, five to one, a bi-metallic strip having an effective length of only four inches could be used instead of one of twenty inches.

Figure 2:
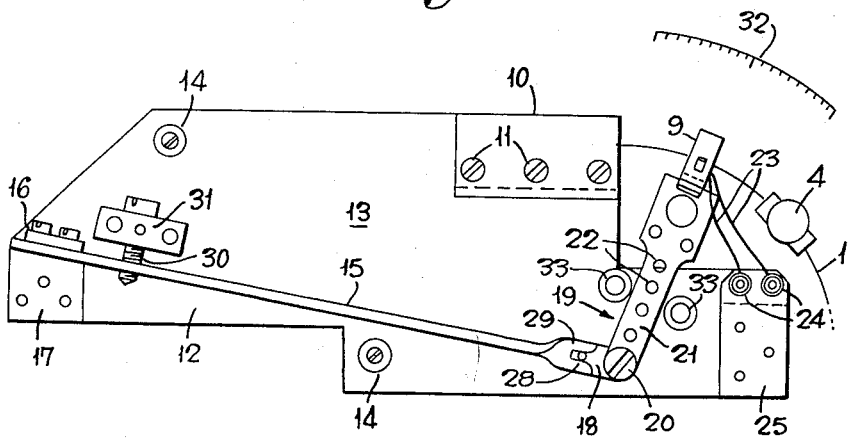

In order that the invention may be more fully understood, reference will now be made to the accompanying drawing in which:

Figure 1 is a diagrammatic plan view of a magnetostrictive delay line having provision for a temperature compensation in accordance with the invention; and Figure 2 is an enlargement of the arrangement providing the temperature compensation in Fig. 1.

Referring to Fig. 1, the delay line comprises a delay element in the form of an appropriate length of magnetostrictive wire 1 mounted on a board or panel 2 on which it is coiled around a central area 2a thereof, with its turns coplanar with each other. The coiled shape of the wire 1 is determined by suitably positioned strip members 3, as of polytetrafluoroethylene, which also serve to maintain adjacent turns of the wire 1 in spaced relationship. At the end of its outer turn the wire 1 passes through supporting bollards 4 and an electromagnetic transducing coil 5, and enters an anti-reflection terminating device 6 secured to the board 2 by screws 7. This terminating device 6 may be constituted, for instance, by two rubber damping blocks which are clamped together to clamp the end of the wire 1 between them. The coil 5 is secured in any convenient manner to a coil mounting block 8. At the other end of the delay line wire 1, the end of the inner turn thereof passes through further supporting bollards 4 and another electromagnetic transducing coil 9, and enters an anti-reflection terminating device 10 which is similar to the device 6, but which is secured, by means of screws 11, to a base plate 12 for a temperature compensating arrangement 13, this base plate 12 being in turn secured to the board 2 by means of screws 14.

As will be seen more clearly with reference to Fig. 2, the temperature compensating arrangement 13 comprises a length of bi-metallic strip 15 one end of which is clamped by a clamping plate 16 against a block 17 mounted on the base plate 12 and the other, free, end of which is coupled to the short limb 18 of a bell crank lever 19 which is pivoted at its apex 20 for movement in a plane parallel to the base plate 12. At the extremity of its long limb 21, the bell crank lever 19 carries the transducing coil 9 through which the inner turn of the delay line wire 1 passes, this coil 9 being secured to the bell crank lever 19 in any suitable manner. A permanent magnet (not shown), as is required in association with either coil 5 or coil 9 may be bonded with an adhesive to the block 8 or the bell crank lever 19, as the case may be. The long limb 21 of the bell crank lever may be apertured along its length, as shown at 22, for the sake of lightness. Flexible leads 23 from the coil 9 are connected to terminals 24 on a terminal block 25 secured to the base plate 12, while leads 26 (Fig. 1) from the coil 5 are connected to terminals 27 on the mounting board 2.

The bi-metallic strip 15 is clamped edge-on to the base plate 12 so that it flexes, in response to variation of the ambient temperature to which both the strip 15 and the delay line wire 1 are subject, in a plane parallel to the base plate 12 and the main mounting board 2 of the delay line. The coupling between the bimetallic strip 15 and the bell crank lever 19 is effected by engagement between an upstanding pin 28 on the latter and a forked free end portion 29 of the bi-metallic strip 15, this end portion 29 being twisted through 90° with respect to the remainder of the strip. Adjustment of the bi-metallic strip 15 for initially positioning the coil 9 in accordance with prevailing conditions is effected by means of an adjusting screw 30 held in a block 31 on the base plate 12 and acting transversely on the strip 15, and a graduated scale 32 may be provided on the main mounting board 2 adjacent the displaceable coil 9 to facilitate this adjustment. Stops 33 carried on the base plate 12 limit movement of the bell crank lever 19 and therefore of the coil 9 carried by it to an overall extent sufficient to permit the maximum degree of compensatory displacement likely to be required.

What we claim is:

1. In combination with a magnetostrictive delay line comprising a magnetostrictive delay element, and input and output coils magnetically coupled to the delay element at spaced positions therealong, one of said coils being mounted for displacement along said element, a temperature compensating arrangement for minimising variation of the delay time of the line with variation in the ambient temperature to which it is subject comprising a bi-metallic strip and a movement magnifying mechanism coupling the bi-metallic strip to the displaceable coil of the delay line, the bi-metallic strip being responsive to variation in ambient temperature to impart to the displaceable coil through said mechanism a magnified compensatory displacement in accordance with flexing movement of the strip.

2. A magnetostrictive delay line as claimed in claim 1 further comprising adjusting means for selectively adjusting the position of the displaceable coil to give a required delay time at any prevailing ambient temperature.

3. A magnetostrictive delay line as claimed in claim 1 wherein said movement magnifying means comprises a pivoted bell crank lever having a short limb which is coupled to the other end of said strip and a long limb on which the displaceable delay line coil is mounted, said pivoted bell crank lever being so mounted that flexing movement of the strip causes pivotal movement of the bell crank lever and resultant magnified compensatory displacement of the displaceable coil.

4. A magnetostrictive delay line as claimed in claim 3, further comprising an adjusting screw acting transversely on the bimetallic strip to cause movement thereof upon adjustment of said screw and consequent displacement of the displaceable coil independently of temperature variation.

References Cited in the file of this patent
UNITED STATES PATENTS

| 1,976,930 | Evans et al. | Oct. 16, 1934 |
| 2,863,120 | Powell | Dec. 2, 1958 |